(12) United States Patent
Phillips et al.

(10) Patent No.: US 9,569,980 B2
(45) Date of Patent: *Feb. 14, 2017

(54) SECURITY DOOR BREACH TRAINING SYSTEM

(71) Applicant: Breaching Technologies, Inc., San Antonio, TX (US)

(72) Inventors: Darron Phillips, San Antonio, TX (US); George Wyatt Tubb, San Antonio, TX (US)

(73) Assignee: Breaching Technologies, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,340

(22) Filed: Dec. 7, 2015

(65) Prior Publication Data

US 2016/0086506 A1 Mar. 24, 2016

Related U.S. Application Data

(63) Continuation of application No. 14/084,384, filed on Nov. 19, 2013, now Pat. No. 9,208,694.

(60) Provisional application No. 61/727,987, filed on Nov. 19, 2012.

(51) Int. Cl.
*G09B 9/00* (2006.01)
*G09B 19/00* (2006.01)
*A62C 99/00* (2010.01)

(52) U.S. Cl.
CPC .......... *G09B 9/003* (2013.01); *A62C 99/0081* (2013.01); *G09B 9/00* (2013.01); *G09B 19/00* (2013.01); *G09B 19/003* (2013.01)

(58) Field of Classification Search
CPC ........... G09B 19/00; G09B 9/00; G09B 9/003; A62C 99/0081
USPC ............................ 49/501, 463; 434/226, 219
See application file for complete search history.

(56) References Cited

U.S. PATENT DOCUMENTS

| | | | | |
|---|---|---|---|---|
| 5,906,493 A * | 5/1999 | Bishop | .................... | G09B 9/00 292/357 |
| 7,611,356 B1 * | 11/2009 | Bishop | ................... | G09B 19/00 434/226 |
| 7,972,139 B2 * | 7/2011 | Staub | .................. | E05B 17/0058 434/226 |
| 8,128,408 B2 * | 3/2012 | Phillips | .................... | G09B 9/00 434/219 |

(Continued)

*Primary Examiner* — Justin Rephann
(74) *Attorney, Agent, or Firm* — Gunn, Lee & Cave, P.C.

(57) ABSTRACT

A security door breach training system comprising a frame member; a plurality of elongate members, each of the elongate members fixed to the frame member and having a free end spaced from the frame member, the plurality of elongate members including at least one capture member, a first clevis member, and a second clevis member fixed to the frame member opposite the first clevis member; at least one retention bar attached between two of the elongate members and spaced a distance from the frame member; and at least one retaining pin adjacent to the frame member, the at least one retaining pin comprising an elongate element at least partially adjacent to the frame member and having a first end and an opposing second end, a retaining pin socket attached to the elongate element proximal to the first end, and a stub extending from the at least one elongate element proximal to the second end.

9 Claims, 6 Drawing Sheets

(56) References Cited

U.S. PATENT DOCUMENTS

| | | | | |
|---|---|---|---|---|
| 8,167,621 B2* | 5/2012 | Allen | | G09B 19/00 109/23 |
| 8,197,257 B2* | 6/2012 | Clewis | | A62B 5/00 434/226 |
| 8,408,917 B2* | 4/2013 | Perrone | | G09B 19/003 434/226 |
| 8,419,435 B2* | 4/2013 | Perrone | | G09B 19/00 434/226 |
| 9,181,735 B2* | 11/2015 | Troxell | | E05B 17/0062 |
| 2005/0050816 A1* | 3/2005 | Manning | | G09B 19/00 52/213 |
| 2005/0058974 A1* | 3/2005 | Phillips | | G09B 19/00 434/226 |
| 2006/0240391 A1* | 10/2006 | Sovine | | G09B 9/003 434/219 |
| 2008/0014564 A1* | 1/2008 | Allen | | G09B 19/00 434/226 |
| 2009/0208914 A1* | 8/2009 | Phillips | | G09B 9/00 434/219 |
| 2009/0215014 A1* | 8/2009 | Walker | | G09B 19/00 434/226 |
| 2010/0109294 A1* | 5/2010 | Klementowicz, III | | G09B 19/00 280/656 |
| 2010/0304344 A1* | 12/2010 | Walker | | G09B 19/00 434/226 |
| 2010/0311015 A1* | 12/2010 | Sovine | | G09B 9/003 434/11 |
| 2011/0025076 A1* | 2/2011 | Shelley | | A62C 99/0081 292/216 |
| 2011/0223569 A1* | 9/2011 | Perrone | | G09B 19/003 434/219 |
| 2011/0247274 A1* | 10/2011 | Clewis | | A62B 5/00 49/61 |
| 2012/0156663 A1* | 6/2012 | Troxell | | E05B 17/0062 434/219 |
| 2012/0208154 A1* | 8/2012 | Perrone | | G09B 19/00 434/226 |
| 2012/0244512 A1* | 9/2012 | Norris | | G09B 19/003 434/387 |
| 2012/0255233 A1* | 10/2012 | Phillips | | F42D 3/00 49/394 |
| 2015/0037767 A1* | 2/2015 | Britton | | A62C 99/0081 434/226 |

* cited by examiner

US 9,569,980 B2

SECURITY DOOR BREACH TRAINING SYSTEM

CROSS REFERENCE TO RELATED APPLICATIONS

This continuation application claims the benefit of and priority to U.S. application Ser. No. 14/084,384, filed Nov. 19, 2013, which in turn claims priority to and the benefit of U.S. provisional application Ser. No. 61/727,987, filed Nov. 19, 2012. Each of these prior filed applications is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to training devices for public-safety and military personnel. More specifically, the present invention is a door breach training system that allows such personnel to quickly and efficiently train for forced-entry scenarios involving burglar bar doors.

2. Description of the Related Art

Both public-safety and military personnel are often faced with the need to perform a forced entry into structures. A forced entry can be, and often is, a life-threatening scenario during which every second counts. Shaving seconds from the operation can mean the difference between life-saving tactical surprise and life-ending ambush. Knowledge of and training with the variations in door-breaching techniques, however slight, as well as practice and conditioning for the door breaching operation, are vital to a tactical situation.

One particular problem that public safety and military personnel may encounter is with security doors, which may also be referred to as a "burglar bar door." Security doors are generally installed over the regular doors to a building, and are designed to help prevent unauthorized entry into the building. Security doors generally include a door member mounted to a frame. The frame is then mounted with lag bolts to a structure, such as the wooden door frame of the door over which the security door is mounted.

Security doors typically come in two basic types. One type is an openwork steel door, which looks like wrought iron and has a tempered glass back panel. The second type looks like a regular wooden or fiberglass door, but is actually made of steel with sturdy side fixings. A security screen door can be added for an additional level of safety. A security door does not have to be only external; for example, they can be used to protect panic rooms, escape routes, basements or vaults.

In effect, the presence of a security door at a targeted breach site presents a unique set of difficulties associated with the breach. For example, a security door means two breaches must be performed: first a breach of the security door, and then a breach of the door it protects.

Because these difficulties can be recreated, however, breaching personnel can train in advance for such breaches. Accordingly, a realistic and lower cost security door breach training system would well serve those who perform emergency or law enforcement-related door breaching operations. Such a system would also benefit civilians whose lives often depend on such operations (e.g., entrapped victims and hostages) by providing a cost-effective, quickly-repeatable alternative means of training for door breach operations.

BRIEF SUMMARY OF THE INVENTION

The present invention replicates scenarios in which trainees encounter a building entrance with a security door in use with a typical exterior door, and allows a trainee to replicate the breach of such an entrance in a cost-effective manner. The system reduces the expense of supplying actual doors, which are destroyed after each breach.

The present invention comprises a frame member; a plurality of elongate members, each of the elongate members fixed to the frame member and having a free end spaced from the frame member, the plurality of elongate members including at least one capture member, a first clevis member, and a second clevis member fixed to the frame member opposite the first clevis member; at least one retention bar attached between two of the elongate members and spaced a distance from the frame member; and at least one retaining pin adjacent to the frame member, the at least one retaining pin comprising an elongate element at least partially adjacent to the frame member and having a first end and an opposing second end, a retaining pin socket attached to the elongate element proximal to the first end, and a stub extending from the at least one elongate element proximal to the second end.

DETAILED DESCRIPTION OF THE VARIOUS EMBODIMENTS

Figure 1:
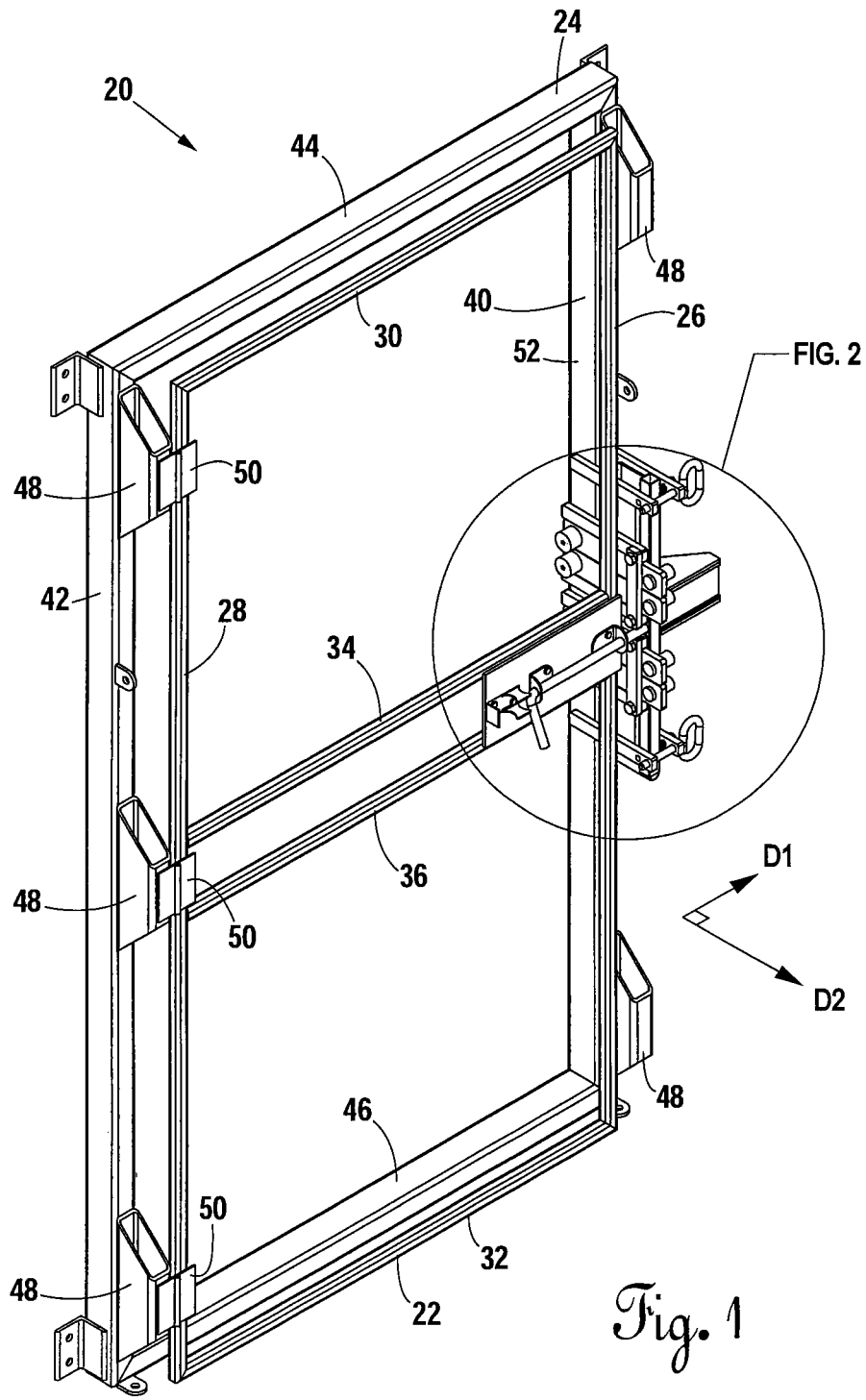
FIG. 1 is an isometric view of an embodiment of the present invention.

As shown in FIG. 1, an embodiment 20 of the invention includes a door 22 attached to a door frame 24. The door 22 comprises two long beams 26, 28 having ends connected to the ends of two short beams 30, 32 to define a rectangular door space. Center beams 34, 36 are positioned within the door space and extend between the two long beams 26, 28.

The frame 24 includes opposing first and second long frame beams 40, 42 and opposing first and second short frame beams 44, 46 connected to define a generally rectangular framed volume. Door offsets 48 extend from the long frame beams 40, 42. The door 22 is attached at one side of the frame 24 with hinges 50, which are fixed to the offsets 48. The first long beam 40 has an inside surface 52 partially defining the framed volume.

Figure 2:
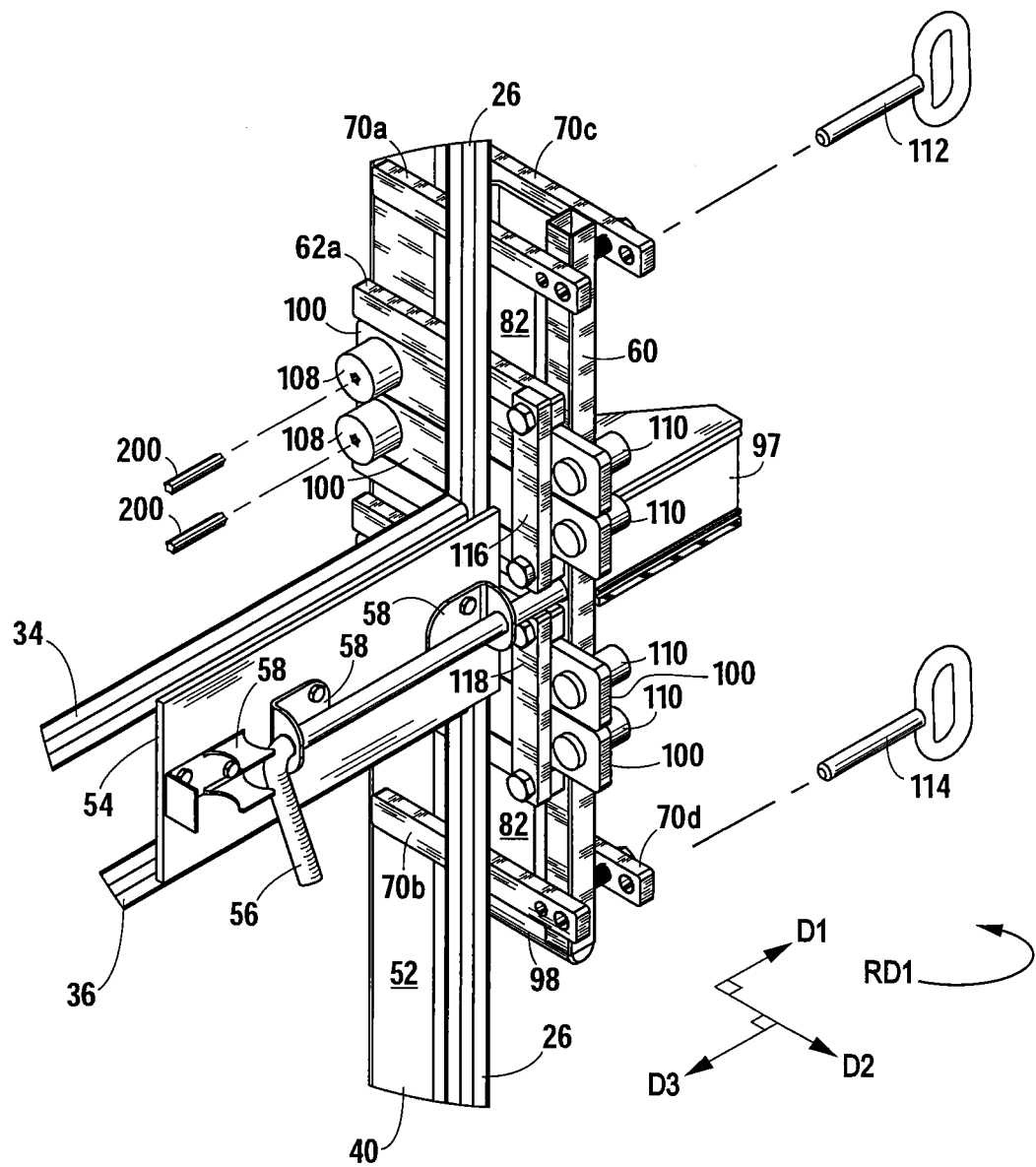
FIG. 2 is an enlarged view of the latch and latch-receiving mechanism of the embodiment shown in FIG. 1.

Referring to FIG. 2, a rectangular latch plate 54 is attached (e.g., welded) to the center beams 34, 36 and one of the long beams 26. A cane bolt 56 is slidably attached to the latch plate 54 with brackets 58. The cane bolt 56 is movable between a first position in which a latching end of the bolt 56 extends past the long beam 26 in a first direction D1, and a second position (not shown) in which the bolt 56 does not extend past the long beam 26. The cane bolt 56 is latchable with a latch-receiving member, such as a length of square tubing 60 in a fixed position relative to the beam 40. A hole 61 is disposed through a side of the square tubing 60 and aligned with the latching end of the cane bolt 56 such that the hole volume intersects with the bolt 56 in the first position.

Figure 3:
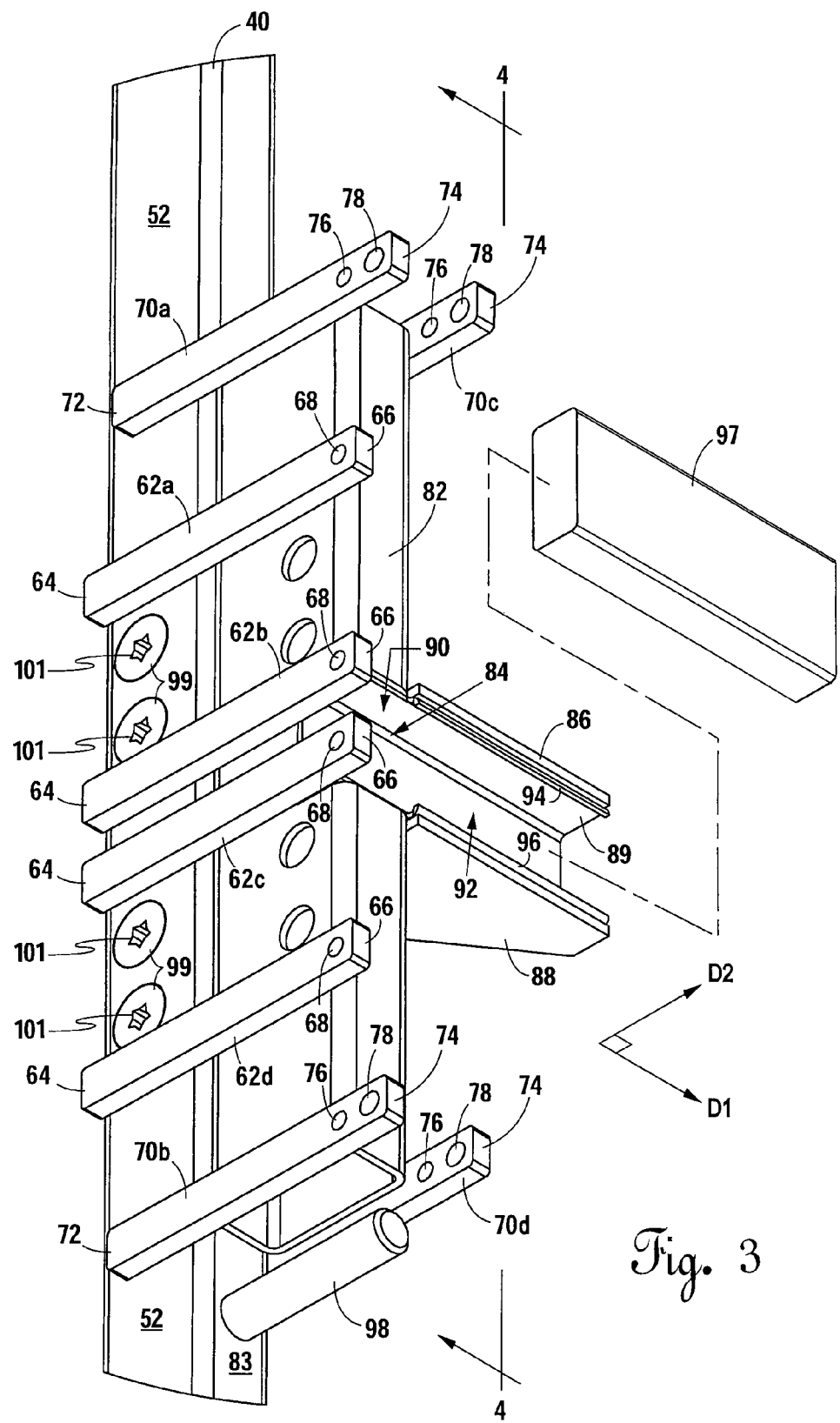
FIG. 3 is an enlarged view of various elements of the latch-receiving mechanism and the first beam of the frame of the embodiment shown in FIG. 1.
Figure 4:
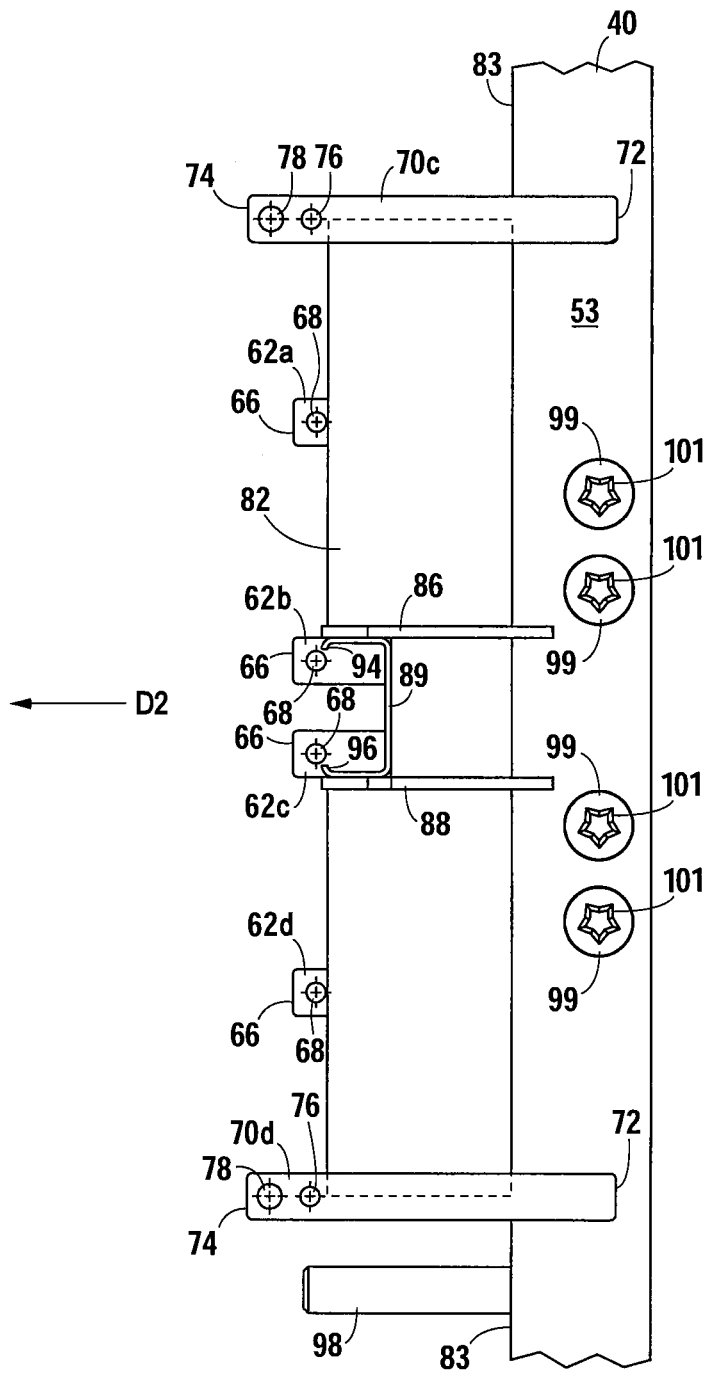
FIG. 4 is a side elevation along line 4-4 of FIG. 3.

Referring to FIGS. 3-4, elongate capture members 62a-d are fixed to and extend away from the first frame beam 40 in a second direction D2, which is perpendicular to the first direction D1. Each of the elongate members 62a-d is generally shaped as a rectangular bar and has a fixed end 64 attached (e.g., welded) to the inside surface 52 of the first frame beam 40 and a free end 66 distal from the frame beam 40. The capture members 62a-d have cylindrical holes 68 disposed therethrough proximal to the free end, with the axes of holes extending parallel to the first direction D1.

Four elongate clevis members 70a-d extend from the frame beam 40 in the second direction D2. Each clevis member 70a-d is generally shaped as a rectangular bar and has a fixed end 72 attached to the first frame beam 40 and a free end 74 distal from the frame beam 40. First and second clevis members 70a-b are fixed to the inside surface 52, while third and fourth clevis members 70c-d are fixed to an opposing outer surface 53 (see FIG. 4).

Each clevis member 70a-d has a cylindrical first hole 76 and a cylindrical second hole 78 disposed therethrough. The first hole 76 is positioned between the second hole 78 and the fixed end 72 of the respective clevis member 70a-d. First holes 76 and second holes 78 of the first and third clevis members 70a, 70c are axially aligned. First holes 76 and second holes 78 of the second and fourth clevis members 70b, 70d are axially aligned.

A rectangular tubular member 82 is fixed to a third planar surface 83 of the first frame beam 40. The tubular member 82 has a square notch 84 opposite the side adjacent to and in contact with the outward surface 83. Identically-shaped first and second plates 86, 88 are attached to and extend from the tubular member 40 in the first direction D1. The plates 86, 88 are attached proximal to ends of the notch 84. A partially-tubular member 89 has a first portion 90 fitted in the notch 84 and a second portion 92 between the first and second plates 86, 88. The second portion 92 has first and second lips 94, 96 extending inward. A wood support 97 is positioned in the slot defined by the partially-tubular member 89, and is inhibited from movement in the second direction D2 by the lips 94, 96.

A cylindrical body 98 has an end fixed to the third surface 83 of the first beam 40 on one side of the tubular member 82. The body 98 is longer than the depth of the tubular member 82 and extends perpendicularly from the third surface 83 past the tubular member 82 in the second direction D2.

Four sockets 99 are disposed in the first beam 40. Each socket 99 has a star-shaped hole 101 disposed therethrough.

Figure 2A:
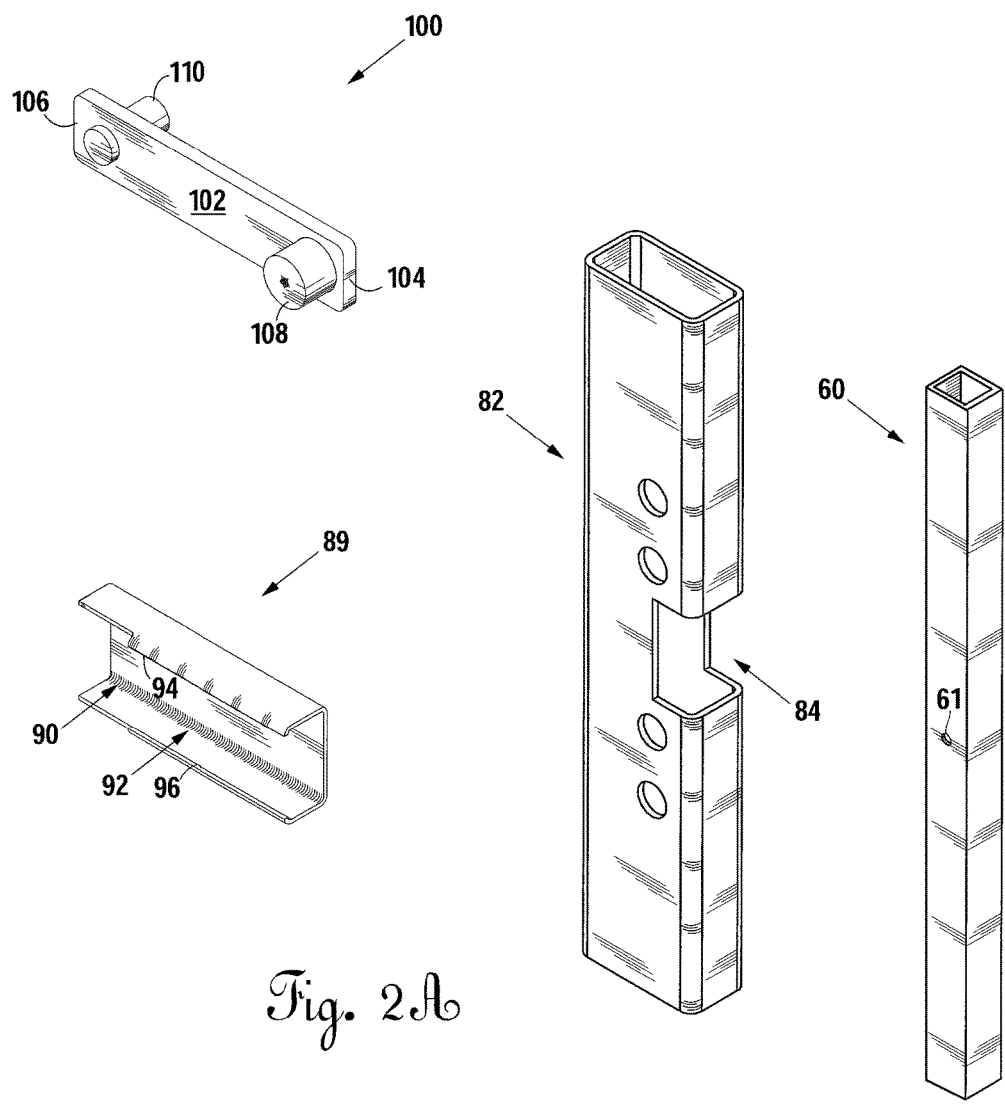
FIG. 2A is an enlarged view of some of the elements shown in FIG. 2.

Referring back to FIG. 2, four retaining pins 100 are fixed to the inside surface 52 of the first beam 40. As shown in FIG. 2A, each retaining pin 100 is identical and comprises an elongate element 102 having a first end 104 and an opposing second end 106, a large socket 108 proximal to the first end 104, and a stub 110 proximal to the second end 106. The stub 110 extends from the elongate element 102 in an opposite direction relative to the corresponding socket 108. The socket 108 includes a hole disposed therethrough and aligned with the sockets 99 disposed through the surface 52 (see FIGS. 3-4) of the beam 40.

Pins 200 extend through the socket holes to fasten the retaining pins 100 to the frame beam 40. Preferably the pins 200 are made of unfilled polycarbonate with a known shear strength. Examples of some types of suitable pins are described in U.S. Pat. No. 6,877,988.

The square tubing 60 is in contact with the cylindrical body 98 and the latching end of the bolt 56 is disposed through the hole 61. The square tubing 60 is inhibited from movement away from rectangular tubing member 82 in the second direction D2 by a first pin 112 disposed through the second holes 78 of the first and third clevis members 70a, 70c, a second pin 114 disposed through the second holes 78 of the second and fourth clevis members 70b, 70d, and the stubs 110 of retention pins 100. Movement of the square tubing 60 is further inhibited by the pins 100 and clevis members 70a, 70b in a third direction D3 and by clevis members 70c, 70d in the first direction D1.

Movement of the retaining pins 100 in the third direction D3 is inhibited by a first retention bar 116 fastened to the first and second capture members 62a, 62b, and a second retention bar 118 fastened to the third and fourth capture members 62c, 62d. The first and second retention bars 116, 118 are fixed to the respective capture members 62a-d with bolts aligned with and extending through holes 68 (see FIG. 3).

As shown in FIG. 2, the embodiment 20 is oriented with the first frame beam 40 being perpendicular to the surrounding ground surface. The square tubing 60 rests on the cylindrical body 98 under the force of gravity and is inhibited from movement by pins 112, 114, stubs 110, retaining pins 100, and rectangular tubing 82.

Figure 5:
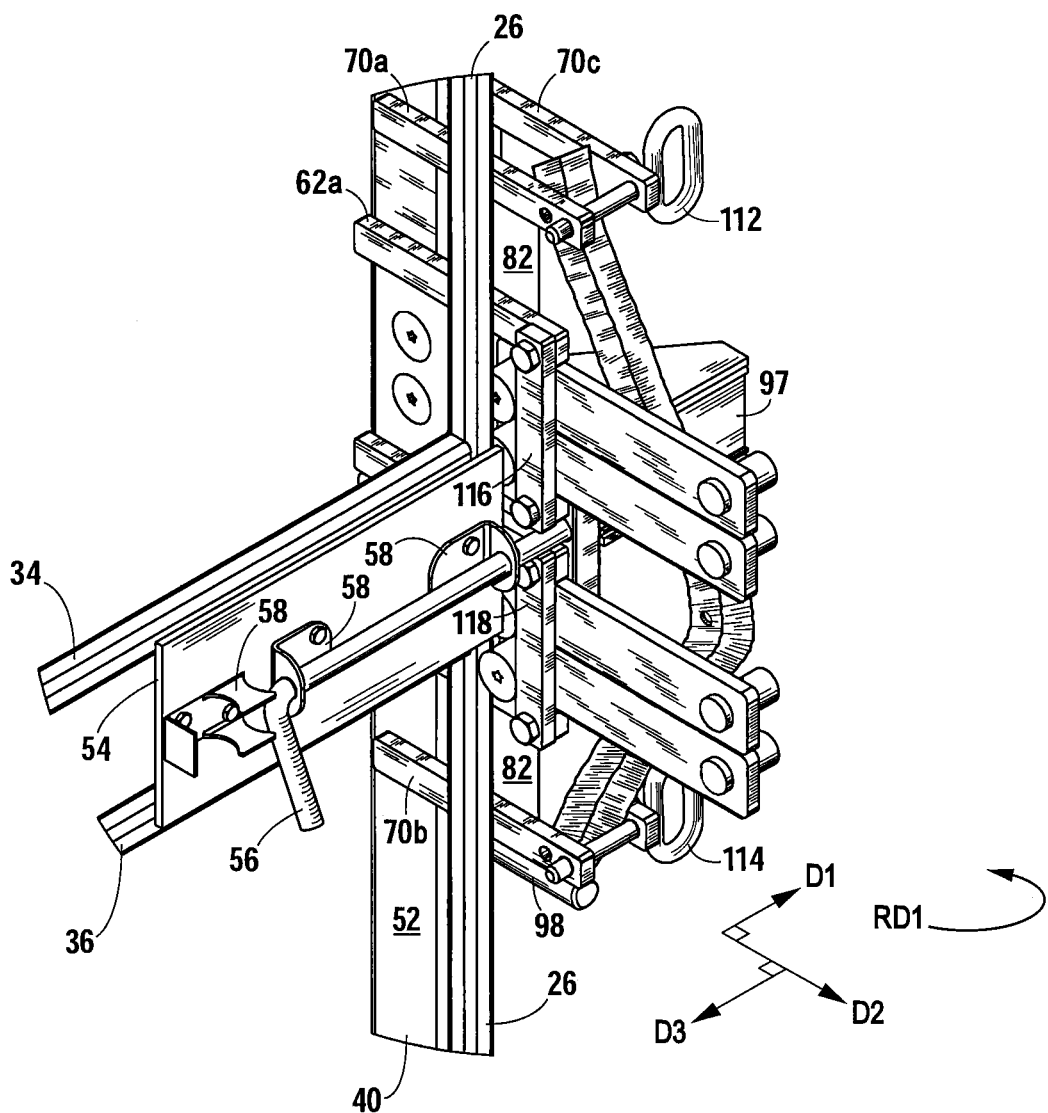
FIG. 5 is an enlarged view of the latch and latch-receiving mechanism of the embodiment shown in FIG. 2 in a post-breach state.

Thereafter, a trainee may insert a blade of a pry bar between the square tubing 60, which serves as an analogue for a typical burglar bar door frame, and the rectangular tubing 82, with the end of the pry bar in contact with the support 97. Thereafter, by rotating the handle of the tool in a first rotational direction RD1, force is applied to the square tubing 60 in a generally outward direction. Because movement of the square tubing 60 is inhibited at various positions away from the force-application point, the tubing 60 bends outward and exerts outward forces on the stubs 110 of the retaining pins 100 and pins 112, 114. With continued application of force, the pins 200 may bend or break, simulating forced removal of bolts attaching a burglar bar door frame to the surrounding mounting structure (e.g., wood door frame). This terminates the fixed connection between the retaining pins 100 and the beam 40 and allowing outward displacement of the retaining pins 100 until the sockets 108 come into contact with the retaining bars, as shown in FIG. 5. The outward bend of the tubing 60 allows the latch to egress from the hole 61 disposed in the square tubing 60, and the door to swing freely relative frame beam 40.

In addition to the configuration described supra, the system may be set up in a number of other configurations to tailor the system to various training situations. For example, the strength of the pins 200 may be changed to simulate different lengths of bolts used to attach a burglar bar door frame (simulated by square tubing 60) to a corresponding door frame. Specifically, stronger pins 200 simulate a use of longer bolts to attach the burglar bar door frame to the wood frame, whereas weaker pins 200 simulate the use of shorter bolts.

In addition, less than four of the retaining pins 100a-d may be attached to the frame beam 40 with pins 200. In a first alternative configuration, only the inner retaining pins 100b-c may be attached to the frame beam 40 with pins 200. In a second alternative configuration, only the outer retaining pins 100a, 100d may be attached the beam 40 with pins 200, which will result in more bend in the square tubing 60 prior to failure of the pins 200 relative to the first alternative configuration. In yet a third alternative configuration, the retaining pins 100a-d are not be fixed to the beam 40, meaning that the only resistance to the breach results from the trainee's ability to bend the burglar bar door frame analogue—i.e., the square tubing 60.

The position of the pins 112, 114 disposed through the clevis members also affects the training parameters. Specifically, the distance of the pins 112, 114 relative to the force-application point on the square tubing 60 affects the degree to which the square tubing may be bent during a simulated breach.

Ultimately, a force may be applied by the trainee to cause failure of one or more of the elements and terminate the fixed relationship between the door 22 and the mechanism by the cane bolt 56, allowing the door 22 to open outwardly. Repeated prying action as described above may cause the support 97 to fail, in which case the support 97 may be removed from inside the partially-tubular member 89 and replaced.

The embodiment may be used alone or in combination with other training doors. For example, the embodiment 20 may be positioned outward of an embodiment of the invention described in U.S. Pat. No. 6,877,988, issued Apr. 12, 2005 to Phillips, and which is incorporated by reference herein. If used in conjunction with such a door, following breach of the embodiment 20 as described above, the trainee would then need to breach the door of the '988 patent, providing a realistic training device for preparing to enter a residential structure that includes a burglar door.

The present invention is described in terms of a preferred illustrative embodiment of a specifically described door breach training system and alternative embodiments thereof. Those skilled in the art will recognize that alternative constructions of such a system can be used in carrying out the present invention. Other aspects, features, and advantages of the present invention may be obtained from a study of this disclosure and the drawings, along with the appended claims.

We claim:

1. A security door breach training system comprising:
a frame member;
a plurality of elongate members, each of the elongate members fixed to the frame member and having a free end spaced from the frame member, the plurality of elongate members including at least one capture member, a first clevis member, and a second clevis member fixed to the frame member opposite the first clevis member;
at least one retention bar attached between two of the elongate members and spaced a distance from the frame member; and
at least one retaining pin adjacent to the frame member, the at least one retaining pin comprising an elongate element at least partially adjacent to the frame member and having a first end and an opposing second end, a retaining pin socket attached to the elongate element proximal to the first end, and a stub extending from the elongate element proximal to the second end.

2. The security door breach training system of claim 1 further comprising a latch-receiving member between the frame member and the stub of the at least one retaining pin.

3. The security door breach training system of claim 2 wherein the latch-receiving member comprises a length of tubing.

4. The system of claim 2 further comprising a body extending from the frame member and in contact with the latch-receiving member.

5. The system of claim 2 further comprising a tubular member positioned between the frame member and the latch-receiving member, the tubular member having a first side fixed to the frame member and a second side opposite the first side defining a notch.

6. The system of claim 5 further comprising a support occupying at least a portion of the notch.

7. The system of claim 1 wherein the socket of the at least one retaining pin is in contact with the at least one retention bar.

8. The system of claim 1 wherein the at least one retention bar is attached to the at least one capture member.

9. The system of claim 1 further comprising a shear pin partially within the at least one retaining pin and partially within the frame member.

* * * * *